United States Patent
Conen et al.

(10) Patent No.: US 8,636,249 B2
(45) Date of Patent: Jan. 28, 2014

(54) STORAGE SYSTEM FOR EMERGENCY EQUIPMENT

(75) Inventors: Daniel Conen, Gerolstein (DE); Sebastian Westphal, Klein Roennau (DE)

(73) Assignee: Airbus Operations GmbH (DE)

( * ) Notice: Subject to any disclaimer, the term of this patent is extended or adjusted under 35 U.S.C. 154(b) by 150 days.

(21) Appl. No.: 12/968,585

(22) Filed: Dec. 15, 2010

(65) Prior Publication Data
US 2011/0168701 A1    Jul. 14, 2011

Related U.S. Application Data

(60) Provisional application No. 61/286,883, filed on Dec. 16, 2009.

(30) Foreign Application Priority Data

Dec. 16, 2009  (DE) .......................... 10 2009 058 437

(51) Int. Cl.
*B64C 1/22*     (2006.01)
*A47F 5/08*     (2006.01)

(52) U.S. Cl.
USPC ........................................ 244/118.1; 312/247

(58) Field of Classification Search
USPC .................... 244/118.1, 118.5; 312/247, 312
See application file for complete search history.

(56) References Cited

U.S. PATENT DOCUMENTS

| | | | | |
|---|---|---|---|---|
| 4,412,601 A | * | 11/1983 | Cooper | 312/242 |
| 6,250,728 B1 | * | 6/2001 | Thorp | 312/247 |
| 6,851,376 B2 | * | 2/2005 | D'Agostino | 108/42 |
| 7,121,510 B2 | * | 10/2006 | Ritts | 244/118.5 |
| 2006/0061121 A1 | | 3/2006 | Williamson et al. | |
| 2006/0174456 A1 | * | 8/2006 | Small | 24/307 |
| 2007/0199188 A1 | | 8/2007 | Barker | |
| 2007/0202759 A1 | | 8/2007 | Bermal | |

FOREIGN PATENT DOCUMENTS

| | | |
|---|---|---|
| DE | 197 41 628 A1 | 3/1999 |
| DE | 10 2008 026 116 A1 | 12/2009 |
| EP | 1 296 855 B1 | 7/2001 |
| GB | 844618 | 8/1960 |
| GB | 2 097 732 A | 11/1982 |

* cited by examiner

*Primary Examiner* — Tien Dinh
*Assistant Examiner* — Michael Wang
(74) *Attorney, Agent, or Firm* — Barnes & Thornburg LLP

(57) ABSTRACT

A storage system for an emergency apparatus provided in a conveyance includes at least one structure-holder connectable to a structural component of the conveyance. A frame is attached to the at least one structure-holder, and a carrier is configured to receive the emergency apparatus. A locking apparatus has a locking position in which the carrier is fastened to the frame, and an unlocking position in which the carrier is detached from the frame. A belt element is fixedly connected to the carrier. A first end of a retaining belt is connectable to a structural component of the conveyance via a belt-winder, and a second end of the retaining belt is fastenable in a detachable manner via a belt lock to the belt element.

8 Claims, 9 Drawing Sheets

STORAGE SYSTEM FOR EMERGENCY EQUIPMENT

CROSS-REFERENCE TO RELATED APPLICATIONS

This patent application claims priority to U.S. Patent Application Ser. No. 61/286,883, filed Dec. 16, 2009, and to German Patent Application No. 10 2009 058 437.4, filed Dec. 16, 2009, the disclosures of which are both incorporated herein by reference.

FIELD OF THE INVENTION

The invention relates to a storage system for an emergency apparatus which is provided in a conveyance, such as a ship or an aircraft for example.

BACKGROUND

Inflatable life rafts are usually present on board an aircraft for the eventuality of an emergency ditching. These life rafts are stored in the folded condition in a manner similar to life jackets, and are usually stowed in an overhead baggage compartment in the passenger cabin of the aircraft. Accommodating a life raft in an overhead baggage compartment, like the removal of said raft from the latter, is very laborious. In addition, an overhead baggage compartment which is used for accommodating a life raft is no longer available for receiving items of hand baggage belonging to the aircraft passengers.

SUMMARY

The underlying object of the invention is therefore to make available a storage system for an emergency apparatus provided in a conveyance, such as a ship or an aircraft for example, which can be operated conveniently and safely and permits space-saving accommodation of the emergency apparatus within the conveyance.

This object is achieved by means of a storage system having the features in claim 1 for an emergency apparatus which is provided in a conveyance.

The storage system according to the invention comprises at least one structure-holder which is connectable to a structural component of the conveyance. Said structure-holder may, for example, be fastened to a rib belonging to an aircraft structure. The fastening of the structure-holder to the structural component may take place by means of screws, rivets or other suitable fastening means. If desired or if necessary, the storage system according to the invention may also comprise two or more structure-holders. The only thing that is essential is that the structure-holder or holders ensure safe fixing of the storage system to the structural component of the conveyance. If the storage system according to the invention is used for accommodating an emergency apparatus in the cabin of an aircraft, the structure-holder can be connected, preferably in a ceiling region of the aircraft cabin between overhead baggage compartments which are provided in the latter, to a structural component, for example a rib belonging to the aircraft structure.

A frame is attached to the structure-holder of the storage system according to the invention. The frame attached to the structure-holder may be of essentially rectangular construction, but may also have any other basic shape that may be desired. The fastening of the frame to the structure-holder may take place by means of screws, rivets or other suitable fastening means. The storage system further comprises a carrier for receiving the emergency apparatus. A locking apparatus is designed to fasten the carrier to the frame when in a locking position and to detach said carrier from said frame when in an unlocking position.

The carrier is preferably of plate-shaped design and is adapted, as regards its shape, to the basic shape of the frame. If the frame has an essentially rectangular basic shape, therefore, the carrier is preferably also essentially rectangular in shape. In a preferred form of embodiment of the storage system according to the invention, the frame has an essentially C-shaped cross-section, at least in certain sections, under which circumstances legs of the essentially C-shaped frame cross-section may have different lengths. In particular, the frame may comprise a section which engages over an outer edge of the carrier, i.e. extends essentially parallel to an outer edge section of said carrier when the latter is attached to the frame.

The emergency apparatus which is intended to be received on the carrier may be an inflatable emergency apparatus such as, for example, a life raft or the like. In order to put an emergency apparatus into the storage system according to the invention, said apparatus may first of all be put onto the carrier, i.e., for example, onto a receiving surface of the latter. The emergency apparatus can then be brought, together with the carrier, into a storage position within the storage system and said carrier can be fastened, with the emergency apparatus that has been put onto it, to the frame of the storage system by suitable actuation of the locking apparatus. Conversely, the carrier can be detached from the frame by moving the locking apparatus into its unlocking position and can thus be taken, together with the emergency apparatus received on it, out of the storage position.

If the storage system is to be of particularly lightweight configuration, it is possible to provide only one frame, which is connected to a structural component of the conveyance by means of a suitable structure-holder or holders, and one carrier, so that the emergency apparatus rests on the carrier in an "open" manner. If desired, however, the storage system may also comprise a covering which may be attached to the structure-holders or the frame and surrounds the emergency apparatus when the carrier is located, with said emergency apparatus, in its storage position.

The storage system according to the invention can be operated conveniently and safely. Because of this, the storage system according to the invention makes it possible to make a needed emergency apparatus ready for use particularly quickly in an emergency. In addition, the storage system according to the invention allows space-saving accommodation of the emergency apparatus. It is thus no longer necessary to occupy stowage space, for example in baggage compartments, which can also be used in other ways.

The storage system according to the invention is particularly well suited to storing an emergency apparatus, such as an inflatable life raft for example, in an aircraft cabin. However, said storage system can also be used in advantageous manner in other conveyances, such as on board ships or in trains for example, for stowing an emergency apparatus in a space-saving manner.

The locking apparatus of the storage system according to the invention preferably comprises a rotatable actuating lever which is connected to the frame. A connecting element may be fastened to the actuating lever in such a way that, as a result of a rotation of the actuating lever, said connecting element is brought into engagement with a holding element attached to the carrier or is detached from said holding element attached to the carrier, depending upon the direction of rotation of said actuating lever. A rotatable actuating lever can be operated in a simple and convenient manner, even when the storage system is intended for mounting in an overhead region, for example in the ceiling region of an aircraft cabin.

The connecting element may be constructed in the form of a driving rod, under which circumstances a first end of said connecting element is preferably fastened to the rotatable actuating lever. A second end of the connecting element may, on the other hand, be designed to be in engagement with the holding element when the locking apparatus is in the locking position. For example, said second end of the connecting element may be received in a bore constructed in the holding element, when the locking apparatus is in the locking position. In order to reduce friction, the holding element is preferably provided with a sliding bearing in which the connecting element, i.e. the second end of said connecting element, can be received when the locking apparatus is in the locking position. The sliding bearing may, for example, be arranged in the region of an inner face of a bore which is constructed in the holding element. Said holding element may, for example, comprise an angle piece having a first leg and also a second leg which extends essentially perpendicularly to the first leg. Said first leg may be fastened to the carrier, for example to the carrier's receiving surface which also carries the emergency apparatus. The second leg then extends essentially perpendicularly to the receiving surface of the carrier and may be provided with a bore which carries, in the region of its inner face, a sliding bearing for receiving the second end of the connecting element.

In a preferred form of embodiment of the storage system according to the invention, the actuating lever is connected to the frame via the connecting element. In an arrangement of this kind, it is possible to dispense with a separate component for connecting the actuating lever to the frame. The connecting element may be connected to the frame by means of a suitable fixing apparatus, for example in the region of its second end that faces away from the actuating lever. The fixing apparatus may, for example, comprise an angle piece having a first leg and also a second leg which extends essentially perpendicularly to the first leg. Said first leg may be fastened to the frame, for example to a face of a frame section that lies opposite an outer edge section of the carrier when the carrier is fastened to the frame. The second leg then extends essentially perpendicularly to the face of the frame section in the direction of the outer edge section of the carrier. Said second leg may be provided with a bore through which the connecting element may be passed. In order to minimise friction, an inner face of the bore preferably carries a sliding bearing.

Two connecting elements may be fastened to the rotatable actuating lever. Said connecting elements preferably extend from the rotatable actuating lever in opposite directions. As a result of a rotation of the actuating lever, the two connecting elements can then be simultaneously brought into engagement with a respective holding element attached to the carrier, or detached from said holding element attached to the carrier, depending upon the direction of rotation of said actuating lever. A locking apparatus comprising two connecting elements permits secure fastening of the carrier to the frame. Because of the fastening of the two connecting elements to only one actuating lever, however, the locking apparatus can still be operated in a simple and convenient manner.

In the carrier, a clearance may be provided which clears the actuating lever of the locking apparatus, when the carrier is fastened to the frame. The clearance which is provided in the carrier and which is preferably arranged in the region of an outer edge section of said carrier thus permits unhindered access to the actuating lever. Said actuating lever may be located in a mounting device which may have, for example, a U-shaped cross-section. A base plate belonging to the mounting device may carry the actuating lever and be arranged in the region of the clearance constructed in the carrier when said carrier is fastened to the frame. Two legs belonging to the mounting device may extend essentially perpendicularly to the base plate and may each be provided with a bore through which the connecting elements are passed. The legs of the mounting device which are provided with a bore thus serve as guide elements for the connecting elements, under which circumstances the bores constructed in the legs are preferably designed as slots in order to guarantee unhindered movement of the connecting elements when the actuating lever is actuated.

The storage system according to the invention may comprise only one locking apparatus. If desired or if necessary, however, the storage system may also be provided with two or more locking apparatuses. For example, two locking apparatuses may be provided in the region of two mutually opposed sides of a frame of essentially rectangular design.

The storage system according to the invention may further comprise a damping apparatus which is designed to damp a movement of the carrier relative to the frame after the detachment of said carrier from the frame as a result of movement of the locking apparatus into its unlocking position. A damping apparatus has a particularly advantageous effect if the storage system is intended to be located in an overhead region, for example in the region of a ceiling of an aircraft cabin. The damping apparatus makes the operation of the storage system not only simpler but also safer, as it reliably prevents the carrier from dropping out of the frame in an uncontrolled manner as soon as the locking apparatus is in its unlocking position. The damping apparatus is preferably designed to permit a maximum speed of the carrier of 0.5 msec when a movement of said carrier relative to the frame takes place. The damping apparatus may comprise a spring, for example a gas pressure spring, but may also comprise a hydraulic or pneumatic damping system.

However, one particularly simple and cost-effectively configured damping apparatus comprises a belt system having at least one retaining belt, the first end of which is connectable to a structural component of the conveyance. The first end of the retaining belt may be attached to the structure-holder of the storage system. However, it is also possible to fasten the first end of the retaining belt separately to a structural component, for example a rib of an aircraft structure or the like. The fastening of the first end of the retaining belt to the structural component of the conveyance preferably takes place via a belt-winder. A second end of the retaining belt may be capable of being fastened to the carrier in a detachable manner. For example, it is conceivably possible to fasten the second end of the retaining belt in a detachable manner by means of a belt lock to a belt element which is fixedly connected to the carrier.

A belt system equipped with a belt-winder ensures reliable damping of the movement of the carrier relative to the frame. Stabilisation of the movement of the carrier is possible if the belt element which is fixedly connected to the carrier is of V-shaped design, i.e. has two ends which are fixedly connected to said carrier. When the carrier, with the emergency apparatus received on it, has reached a desired position, said carrier can be easily separated from the retaining belt of the belt system by detaching the belt lock. The belt-winder then ensures automatic winding-up of the retaining belt and thereby prevents the latter from hanging down in a troublesome manner, for example into an aisle of an aircraft cabin.

The belt system of the damping apparatus may comprise only one retaining belt. If desired or if necessary, however, it is also possible to equip the belt system with two or more retaining belts. If the storage system comprises an essentially rectangular carrier, it is sensible to provide the belt system with two retaining belts which can be fastened to the carrier in a detachable manner via belt elements which are attached to said carrier in the region of two mutually opposed sides of the latter.

For the purpose of fastening the emergency apparatus in the carrier, said carrier may comprise a fastening apparatus which is provided with at least one predetermined breaking point. The fastening apparatus may, for example, comprise a belt or a number of belts which is/are provided with at least one predetermined breaking point with a reduced cross-section. If the emergency apparatus in question is an inflatable one, such as a life raft for example, it can thus be brought into the position of use, together with the carrier, in a convenient manner. For example, an inflatable life raft can be placed in the water together with the carrier. When the life raft then inflates automatically in the water, the carrier automatically detaches itself from the life raft as a result of the failure of the at least one predetermined breaking point of the fastening apparatus.

It is possible to further provide on the carrier an apparatus for mounting rollers on a surface of said carrier, which apparatus lies opposite the receiving surface of the carrier that carries the emergency apparatus. Furthermore, a plurality of rollers may also be fixedly mounted on the carrier in the region of the surface which lies opposite that receiving surface of said carrier which carries the emergency apparatus. The carrier, with the emergency apparatus received on it, can then be transported in a convenient manner, for example within the cabin of an aircraft.

BRIEF DESCRIPTION OF THE DRAWINGS

A preferred form of embodiment of the invention will now be explained in greater detail with the aid of the appended diagrammatic drawings, of which.

DESCRIPTION OF THE ILLUSTRATIVE EMBODIMENTS

Figure 1:
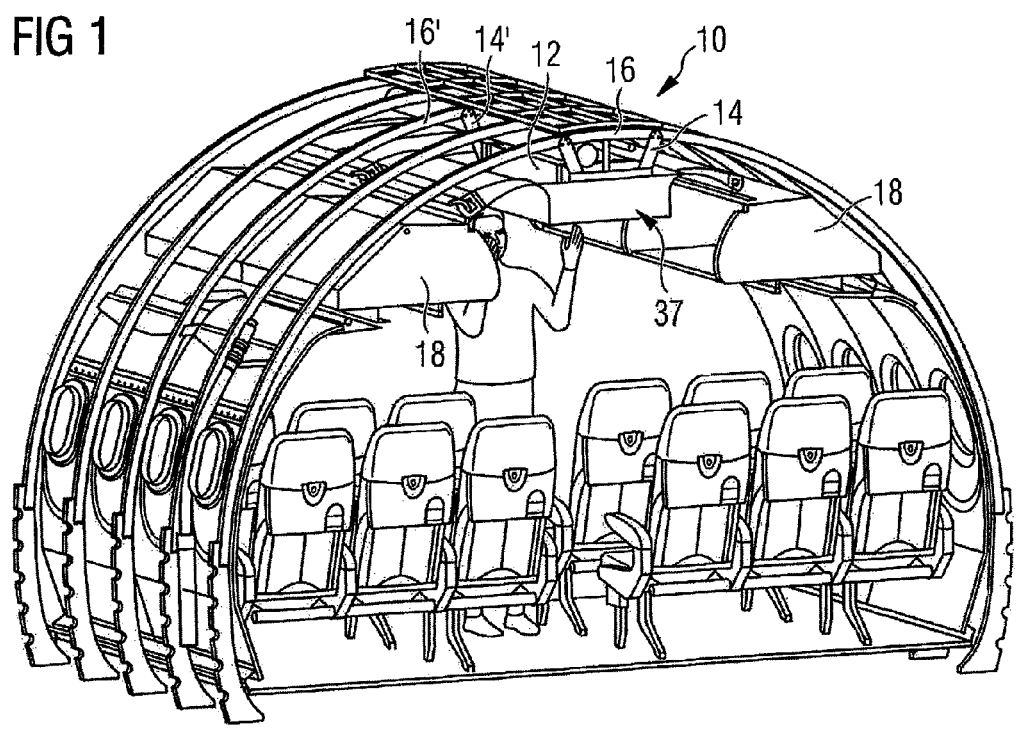
FIG. 1 shows a storage system which serves to stow an emergency apparatus in the form of an inflatable life raft in the ceiling region of a passenger cabin of an aircraft.

In the embodiment illustrated in the drawings, a storage system 10 serves to stow an emergency apparatus 12 constructed in the form of an inflatable life raft in a passenger cabin of an aircraft. The storage system 10 comprises two structure-holders 14, 14' which are illustrated, in particular, in FIG. 2 and are each connected to a structural component 16, 16' of the aircraft when said storage system 10 is in the mounted condition in the aircraft. In the embodiment shown in the drawings, the structural components 16, 16' to which the structure-holders 14, 14' of the storage system 10 are fastened are formed by two ribs belonging to the aircraft structure which extend essentially parallel to one another.

As can best be seen in FIG. 1, the structure-holders 14, 14' are located in a ceiling region of the aircraft cabin between overhead baggage compartments 18 provided in said cabin, so that the storage system 10 is arranged in an overhead region above an aisle located in said aircraft cabin. In the embodiment of a storage system 10 shown in the drawings, the structure-holders 14, 14' are of essentially H-shaped design, but may also have any other shape that may be desired. However, it is advantageous if the structure-holders 14, 14' have suitably shaped apertures which make it possible to pass lines, such as, for example, an air-conditioning pipe 20 which extends along a longitudinal axis of the aircraft cabin in the ceiling region of the latter, through said structure-holders 14, 14'.

A frame 22 having an essentially rectangular basic shape is fastened to an end of the structure-holders 14, 14' that faces away from the structural components 16, 16'. In particular, the fastening of the frame 22 to the structure-holders 14, 14' takes place in the region of the short sides of the essentially rectangular-shaped frame 22. Said frame 22 has an essentially C-shaped cross-section and comprises, along each of its long sides, a section 24, 24' which is formed by an upper leg of the essentially C-shaped frame cross-section, i.e. the leg that faces towards the ceiling of the aircraft cabin when the frame 22 is in the mounted condition in said cabin. The frame sections 24, 24' each extend essentially perpendicularly from a peripheral section 26 of the frame 22 and project further into an inner region of the frame 22 than an opposed, lower leg of the essentially C-shaped frame cross-section i.e. the leg that faces away from the ceiling of the aircraft cabin when the frame is in the mounted condition in said cabin.

The storage system 10 further comprises a carrier 28 which is constructed in the form of an essentially rectangular plate. The emergency apparatus 12 is fastened on said carrier 28, i.e. on a receiving surface 30 of the latter. A fastening apparatus 32, which comprises two belts 34, 34' which engage over the emergency apparatus 12 and connect it to the carrier 28, serve for fastening said emergency apparatus 12 on said carrier 28. As can be best be seen in FIG. 8, the belts 34, 34' are each provided with a predetermined breaking point 36, 36'.

Figure 2:
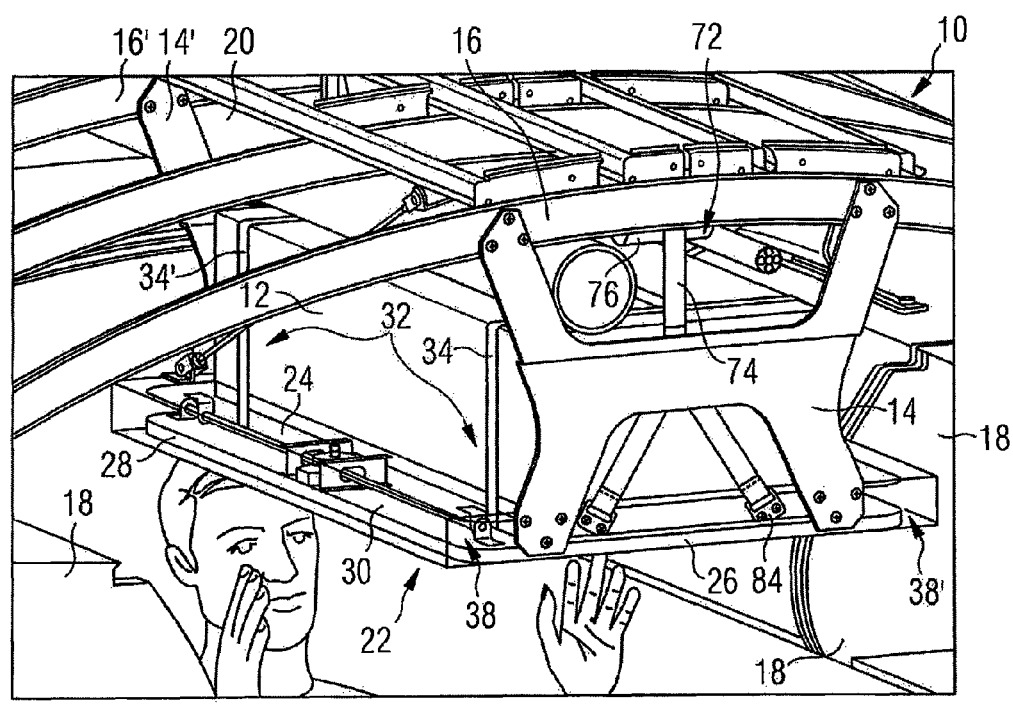
FIG. 2 shows an enlarged detail view of the storage system according to FIG. 1.
Figure 3:
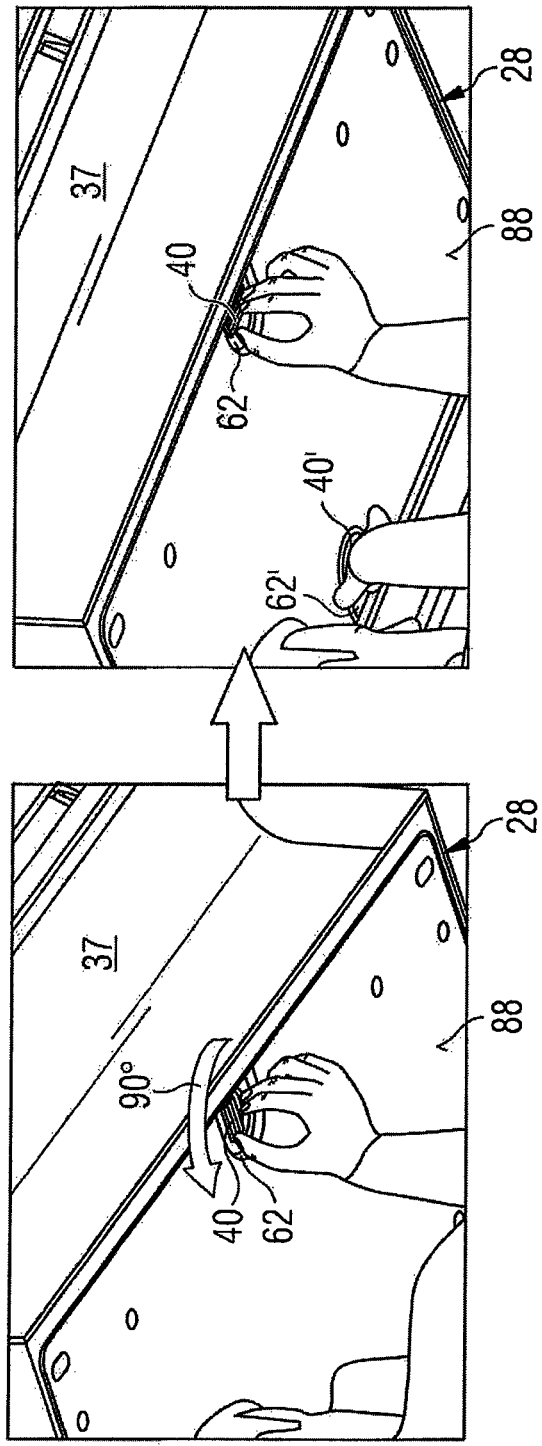
FIGS. 3a and 3b show the actuation of a locking apparatus belonging to the storage system according to FIG. 1.

The storage system 10 may comprise only one frame 22 and one carrier 28, so that the emergency apparatus 12 rests, as represented in FIG. 2, on the carrier 28 in an "open" manner. However, said storage system 10 may also comprise a covering 37 which is shown in FIGS. 1, 3a and 3b and which is attached to the structure-holders 14, 14' or the frame 22 and surrounds the emergency apparatus 12 when the carrier 28 is located, with said emergency apparatus 12, in a storage position in the storage system 10.

Figure 4:
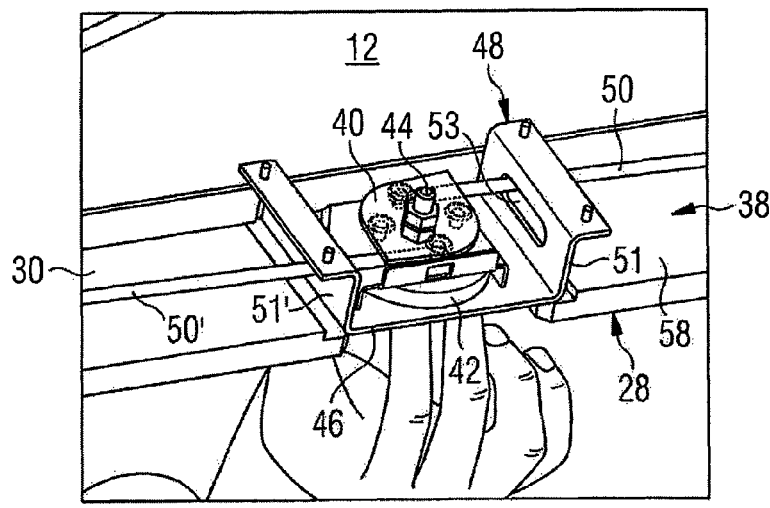
FIG. 4 shows a detail view of a rotatable actuating lever belonging to the locking apparatus.

The carrier 28, with the emergency apparatus 12 fastened on it, can be fastened to the frame 22 in a detachable manner by means of two locking apparatuses 38, 38' of identical make-up. Each locking apparatus 38, 38' comprises a rotatable actuating lever 40, 40' (see FIGS. 3a and 3b). The rotatable actuating lever 40 of the locking apparatus 38 is illustrated in detail in FIG. 4. Said actuating lever 40 has a base 42 of circular-cylindrical construction which is fastened on a base plate 46 of a mounting device 48 so as to be rotatable about a spindle 44. First ends of two connecting elements 50, 50', which are each constructed in the form of a driving rod, are fastened to the actuating lever 40 in such a way that said connecting elements 50, 50' extend from the actuating lever 40 in opposite directions. Rotation of the actuating lever 40 brings about displacement of the connecting elements 50, 50' along their respective longitudinal axes.

The mounting device 48 further comprises two legs 51, 51' which extend essentially perpendicularly to the base plate 46 and are each provided with a bore 53 through which the connecting elements 50, 50' are passed. The legs 51, 51' of the mounting device 48, which are each provided with a bore 53, thus serve as guide elements for the connecting elements 50, 50', under which circumstances the bore 53 constructed in each leg 51, 51' is designed as a slot in order to guarantee unhindered movement of the connecting elements 50, 50' when the actuating lever 40 is actuated.

Figure 5:
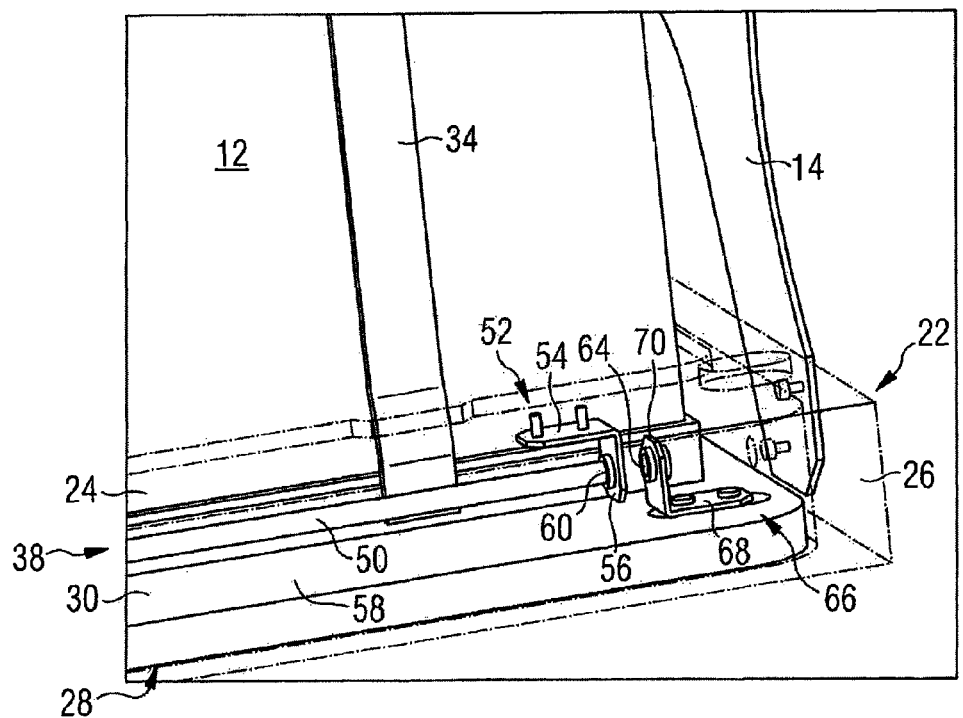
FIG. 5 shows a detail view of an end of a connecting element, which end faces away from the actuating lever, and also of a holding element belonging to the locking apparatus.

A second end of each connecting element 50, 50', which end faces away from the actuating lever 40, is fastened to the frame 22 by means of a fixing apparatus 52 (see FIG. 5). The connecting elements 50, 50' thus serve to connect the actuating lever 40, and also the mounting device 48 connected to it, to the frame 22. The fixing apparatus 52 is constructed in the form of an angle piece having a first leg 54 and also a second leg 56 which extends essentially perpendicularly to the first leg 54. Said first leg 54 of the fixing apparatus 52 is fastened to a face of the frame section 24 that lies opposite an outer edge section 58 of the carrier 28 when the latter is connected to the frame 22. The second leg 56 of the fixing apparatus 52 extends essentially perpendicularly to the said face in the direction of the outer edge section 58 of the carrier 28. A bore 60 through which the connecting element 50 passes is constructed in the second leg 56 of the fixing apparatus 52. In order to reduce friction, an inner face of the bore 60 carries a sliding bearing.

The connecting elements 50, 50' of the locking apparatuses 38, 38' of identical make-up extend along the long sides of the frame 22 which has a rectangular basic shape, the actuating levers 40, 40' of said locking apparatuses 38, 38' being each arranged approximately over half the length of the long sides of the frame 22. As can best be seen in FIGS. 3a and 3b, two clearances 62, 62' which provide access to the actuating levers 40, 40' of the locking apparatuses 38, 38' are constructed in the carrier 28.

Actuation of the locking apparatuses 38, 38' takes place, in each case, by a rotation, which is illustrated in FIGS. 3a and 3b, of the actuating levers 40, 40' by 90°. The effect of such a rotation of the actuating levers 40, 40' is that the two connecting elements 50, 50' connected to them are displaced along their respective longitudinal axes in the direction of said actuating levers 40, 40'. FIG. 5 illustrates the position of that second end of the connecting element 50 which faces away from the actuating lever 40, when the locking apparatus 38 is located in its unlocking position. Although, when it is in its position which is shown in FIG. 5, that second end of the connecting element 50 which faces away from the actuating lever 40 is still in engagement with the bore 60 constructed in the second leg 56 of the fixing apparatus 52, said second end is nevertheless not received in a bore 64 which is constructed in a holding element 66.

The holding element 66 is constructed, in a manner similar to the fixing apparatus 52, in the form of an angle piece having a first leg 68 and also a second leg 70 which extends essentially perpendicularly to the first leg 68. Said first leg 68 of the holding element 66 is fastened to the receiving surface 30 of the carrier 28, so that the second leg 70 of said holding element 66 extends essentially perpendicularly from the receiving surface 30 of the carrier 28 in the direction of the frame section 24. The bore 64 passes through the second leg 70 of the holding element 66 and carries a sliding bearing in the region of the inner face of said bore. When the locking apparatus 38 is in its locking position, that second end of the connecting element 50 which faces away from the actuating lever 40 is received in the bore 64 constructed in the second leg 70 of the holding element 66. As a result, the carrier 28, with the emergency apparatus 12 fastened on it, is fastened to the frame 22 in a detachable manner.

A second end of the connecting element 50' which is not illustrated in the drawings but which faces away from the actuating lever 40, is intended to interact, when the locking apparatus 38 is in the locking position, with a further holding element which has an identical make-up to the holding element 66 which is intended to interact with the connecting element 50. In the same way, the connecting elements of the locking apparatus 38', which are likewise not illustrated in the drawings, are intended to interact with suitably shaped holding elements fastened to the carrier 28.

Figure 6A:
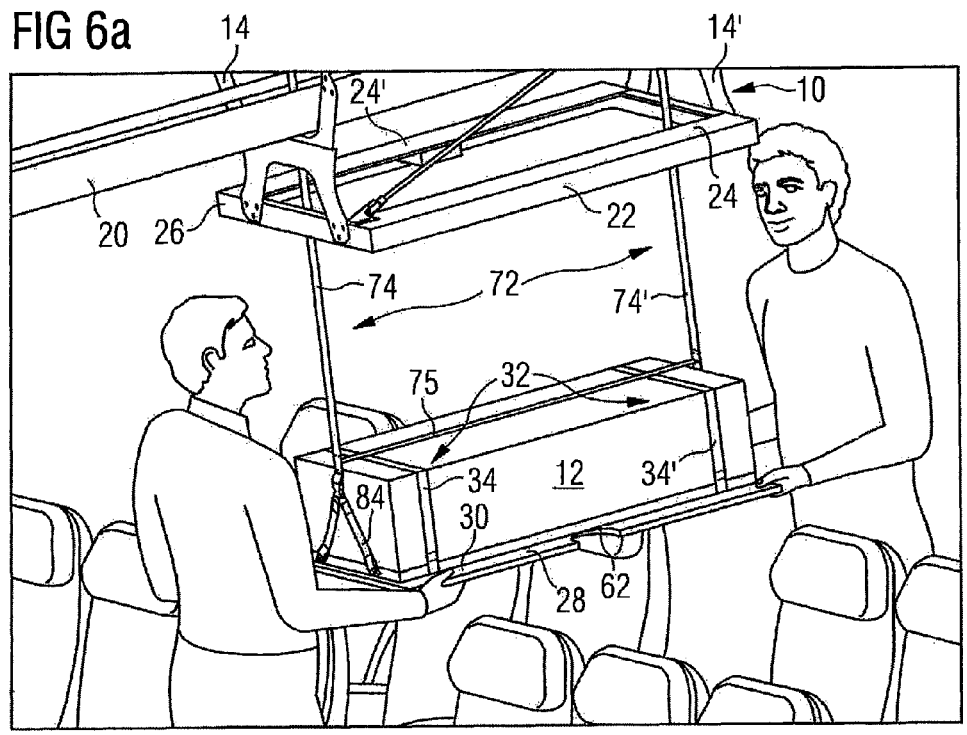
FIGS. 6a and 6b show the lowering of a carrier, with the emergency apparatus in the form of an inflatable life raft received on said carrier, relative to a frame belonging to the storage system.
Figure 6B:
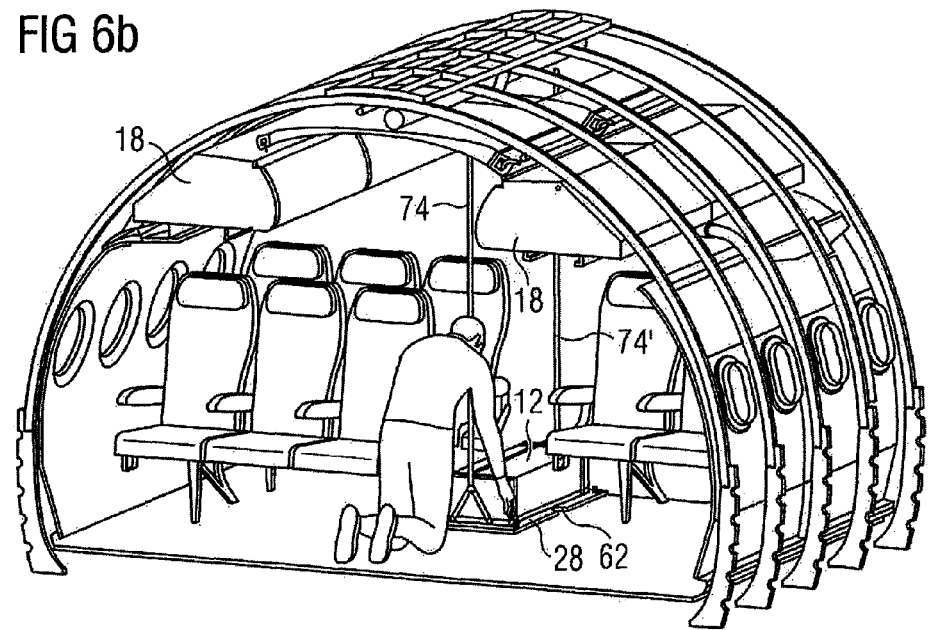

When the two locking apparatuses 38, 38' are in their unlocking position, the carrier 28, with the emergency apparatus 12 fastened on it, can be lowered relative to the frame 22 as shown in FIGS. 6a and 6b. In order to guarantee controlled lowering of the carrier 28, with the emergency apparatus 12 fastened on it, the storage system 10 has a damping apparatus 72 which is constructed in the form of a belt system. Said damping apparatus 72 guarantees that the speed of lowering of the carrier 28, with the emergency apparatus 12 fastened on it, does not exceed 0.5 m/sec.

Figure 7A:
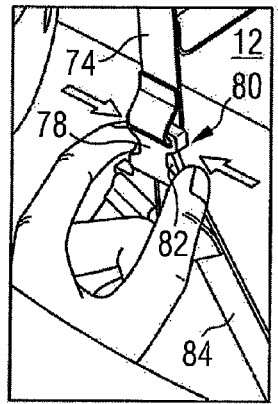
FIGS. 7a and 7b show the detachment of a retaining belt belonging to a damping system from a belt element which is fixedly connected to the carrier.
Figure 7B:
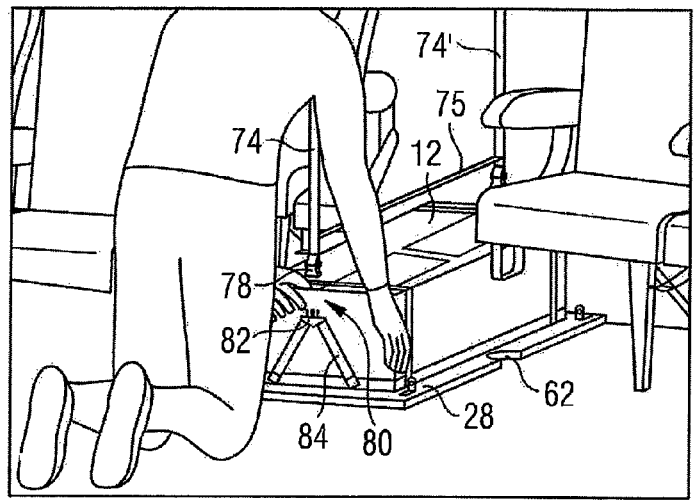
Figure 8:
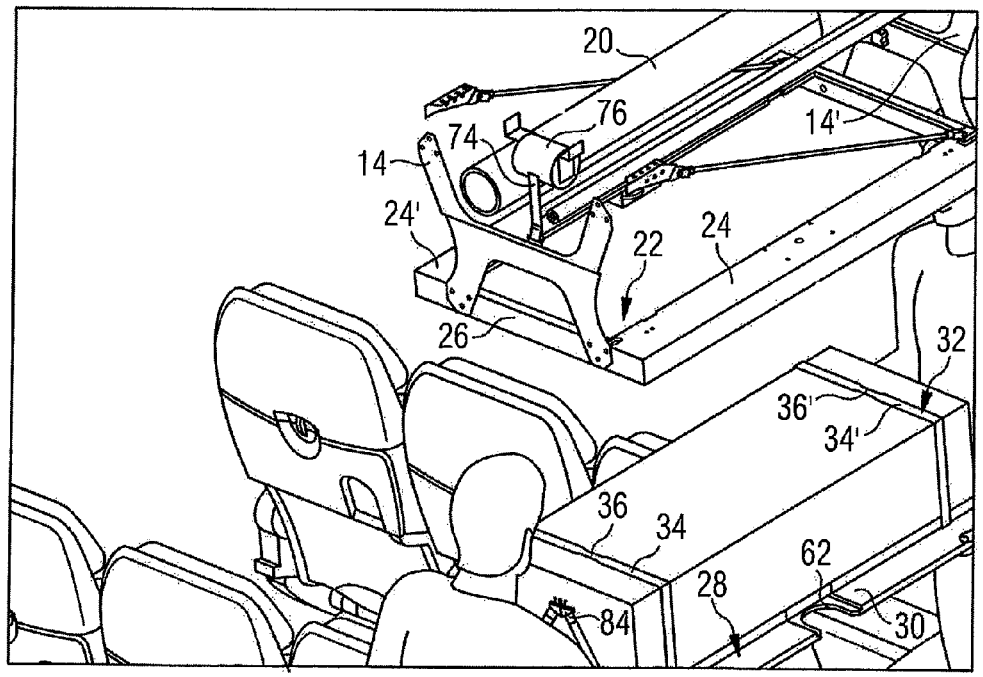
FIG. 8 shows the storage system according to FIG. 1 wherein the carrier, with the emergency apparatus in the form of an inflatable life raft received on said carrier, is completely uncoupled from the other components of the storage system.

The belt system forming the damping apparatus 72 has two retaining belts 74, 74', whose first ends are fastened, via a belt-winder 76 in each case, to the structural components 16, 16' formed by two ribs belonging to the aircraft structure which extend essentially parallel to one another (see FIGS. 2 and 8). A connecting belt 75 connects the two retaining belts 74, 74'. A second end of the retaining belts 74, 74' carries, in each case, a first element 78 of a belt lock 80 which is illustrated in detail in FIG. 7a. A second element 82 of said belt lock 80 is attached to a belt element 84 of V-shaped construction which, in turn, is fixed to the carrier 28. When the carrier 28, with the emergency apparatus 12 fastened on it, has reached an end position which is illustrated in FIG. 7b, the retaining belt 74 can be separated from the belt element 84, and thereby from the carrier 28, by opening the belt lock 80. In the same way, the retaining belt 74' can be separated from a further belt element, which is not illustrated in the drawings, and thereby from the carrier 28, by opening a corresponding belt lock. The belt-winder thereupon ensures automatic winding-up of the retaining belt 74. In corresponding manner, the retaining belt 74' is wound up automatically with the aid of a belt-winder. This prevents the retaining belts 74, 74' from hanging down in a troublesome manner into the aisle of the aircraft cabin.

After being separated from the retaining belts 74, 74', the carrier 28, with the emergency apparatus 12 fastened on it, is moved through the aircraft cabin in the direction of a door 86.

In order to facilitate the movement of the carrier 28, with the emergency apparatus 12 fastened on it, through the aircraft cabin, said carrier 28 may be provided with rollers on its surface 88 that faces away from its receiving surface 30. As an alternative to this, an apparatus for mounting rollers may also be provided in the region of the surface 88 of the carrier 28, so that rollers can be mounted on said surface 88 of the carrier 28 if necessary.

Figure 9A:
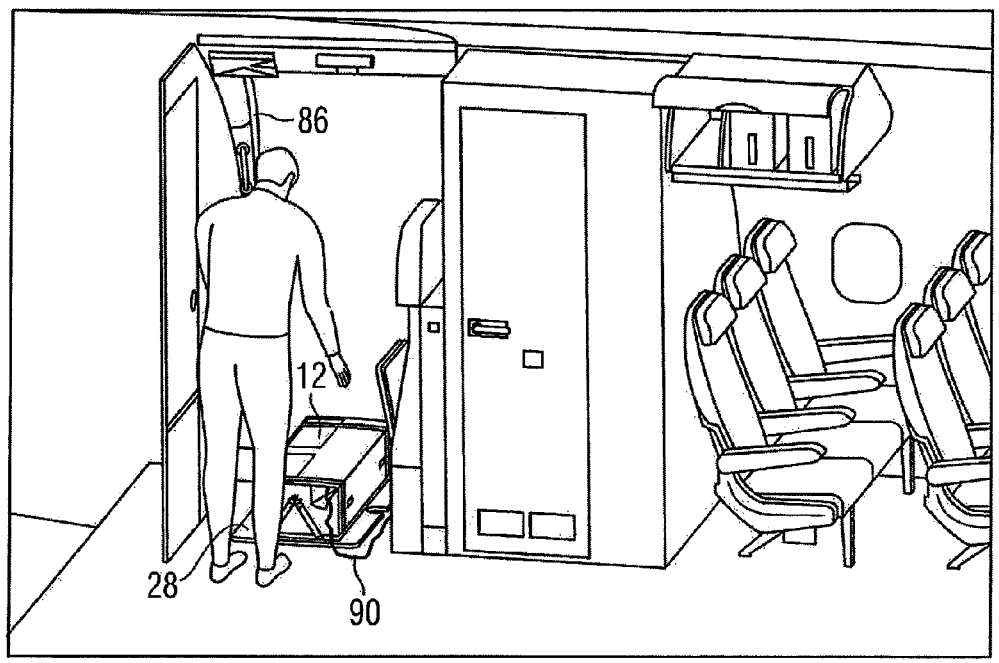
FIGS. 9a to 9e show the letting-down into the water of the emergency apparatus in the form of an inflatable life raft received on said carrier.
Figure 9B:
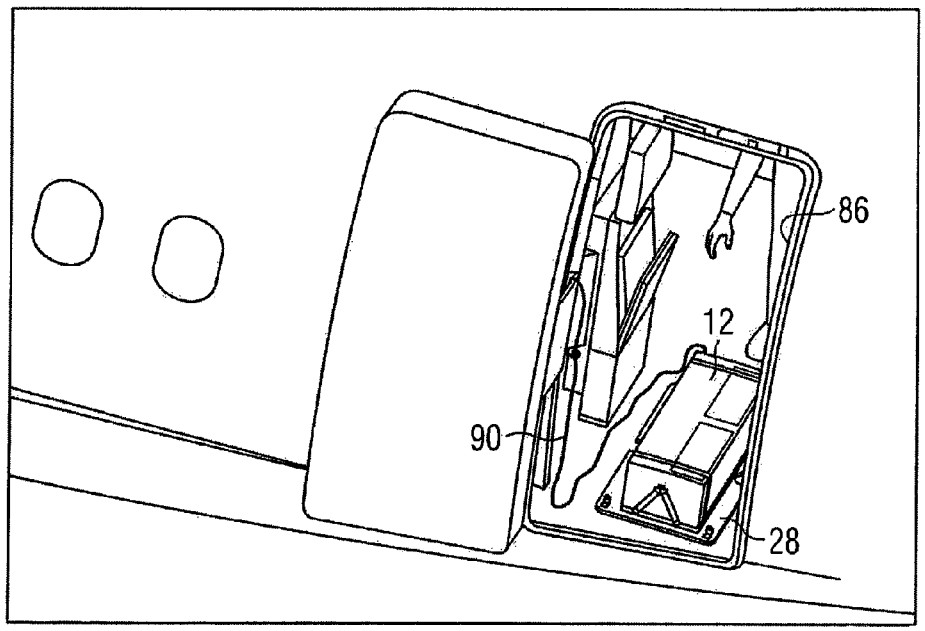
Figure 9C:
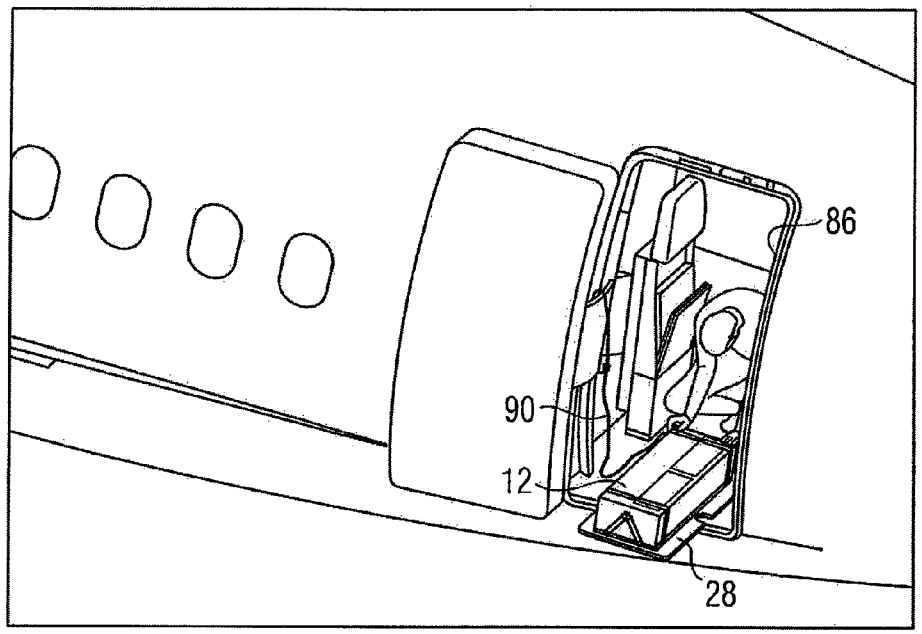
Figure 9D:
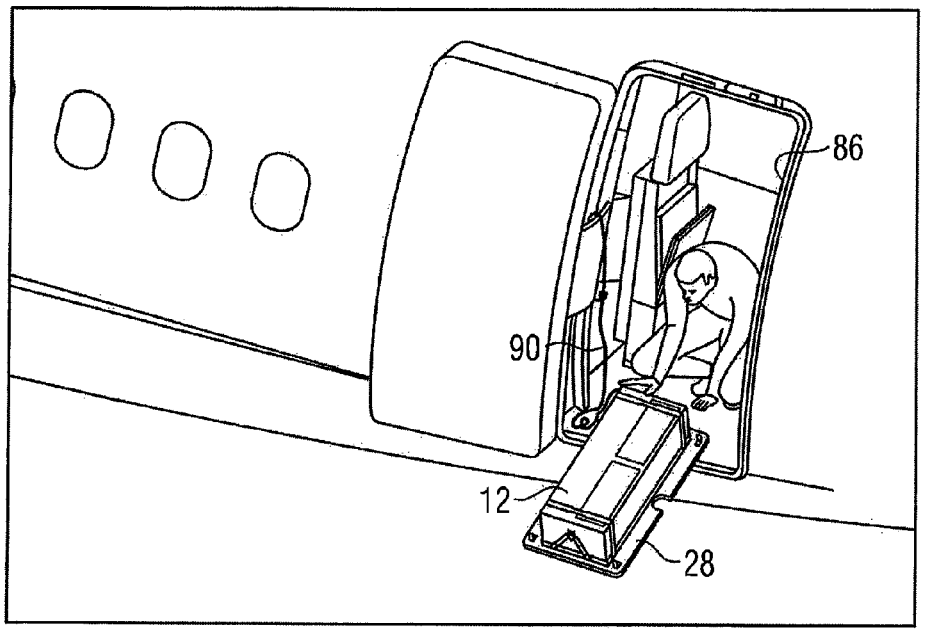
Figure 9E:
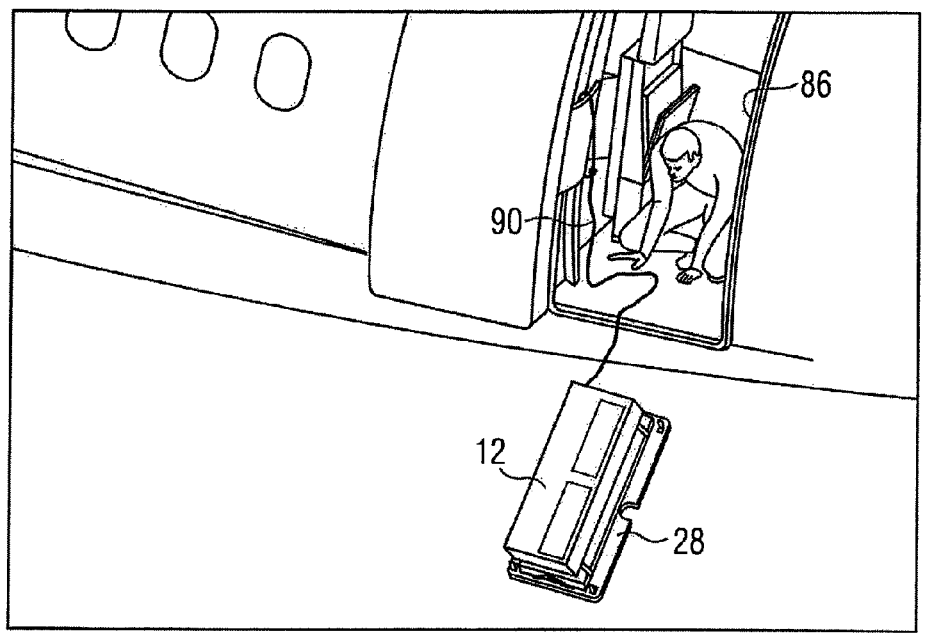

When the carrier 28, with the emergency apparatus 12 fastened on it, has reached a desired position in the region of the door 86 of the aircraft cabin (see FIG. 9a), a securing line 90 fixed to said emergency apparatus 12 is fixed to a support arm of the door 86 (see FIG. 9b). The carrier 28, with the emergency apparatus 12 fastened on it, is then thrown into the water, as represented in FIGS. 9c to 9e, under which circumstances the securing line 90 prevents the carrier 28, with the emergency apparatus 12 fastened on it, from floating away.

Figure 10:
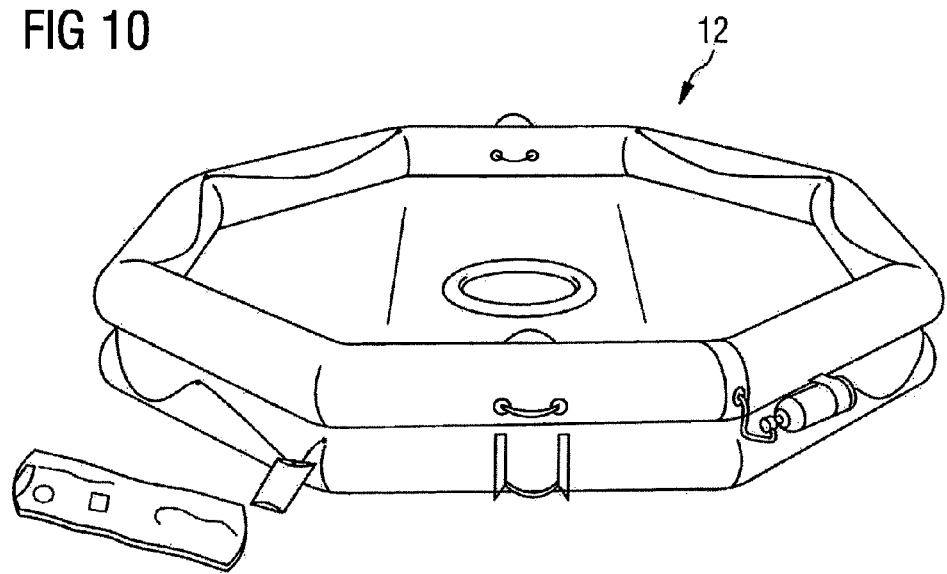
FIG. 10 shows the life raft in the inflated condition.

Outside the aircraft cabin, the emergency apparatus 12 is automatically filled with air. In the process, the belts 34, 34', which fasten said emergency apparatus 12 to the carrier 28, tear in the region of their predetermined breaking points 36, 36'. The carrier 28 is thereby detached from the emergency apparatus 12, which is thereupon able to assume the inflated configuration illustrated in FIG. 10.

The invention claimed is:

1. A storage system for an emergency apparatus provided in an aircraft, the storage system comprising:
   at least one structure-holder connectable to a rib of an aircraft structure,
   a frame attached to the at least one structure-holder,
   a carrier configured to receive the emergency apparatus,
   a locking apparatus having a locking position and an unlocking position, the locking apparatus fastening the carrier to the frame in the locking position and detaching the carrier from the frame in the unlocking position,
   a belt element fixedly connected to the carrier,
   a belt-winder,
   a belt lock having a first element and a second element, the second element attached to the belt element, and
   a retaining belt separate from the belt element and having a first end and a second end, the first end fastened to the rib of the aircraft structure via the belt-winder, the second end attached to the first element of the belt lock and fastenable in a detachable manner via the first and second elements of the belt lock to the belt element.

2. The storage system according to claim 1, characterised in that the locking apparatus comprises a rotatable actuating lever which is connected to the frame and to which a connecting element is fastened in such a way that, as a result of a rotation of the rotatable actuating lever, the connecting element is brought into engagement with a holding element attached to the carrier or is detached from the holding element attached to the carrier, depending upon the direction of rotation of the rotatable actuating lever.

3. The storage system according to claim 2, characterised in that the connecting element is constructed in the form of a driving rod, a first end of which is fastened to the rotatable actuating lever and a second end of which is received in a sliding bearing forming part of the holding element when the locking apparatus is in the locking position.

4. The storage system according to claim 2, characterised in that the rotatable actuating lever is connected to the frame via the connecting element.

5. The storage system according to claim 2, characterised in that two connecting elements, which extend from the rotatable actuating lever in opposite directions, are fastened to the rotatable actuating lever.

6. The storage system according to claim 2, characterised in that the carrier defines a clearance which clears the rotatable actuating lever of the locking apparatus when the carrier is fastened to the frame.

7. The storage system according to claim 1, characterised in that the carrier comprises a fastening apparatus configured to fasten the emergency apparatus to the carrier, the fastening apparatus having at least one predetermined breaking point.

8. The storage system according to claim 1 wherein the emergency apparatus is a life raft, the conveyance is an aircraft and the storage system stores the life raft in a cabin of the aircraft.

* * * * *